T. V. NICHOLS.
Hedge-Trimming Machines.
No. 214,689. Patented April 22, 1879.
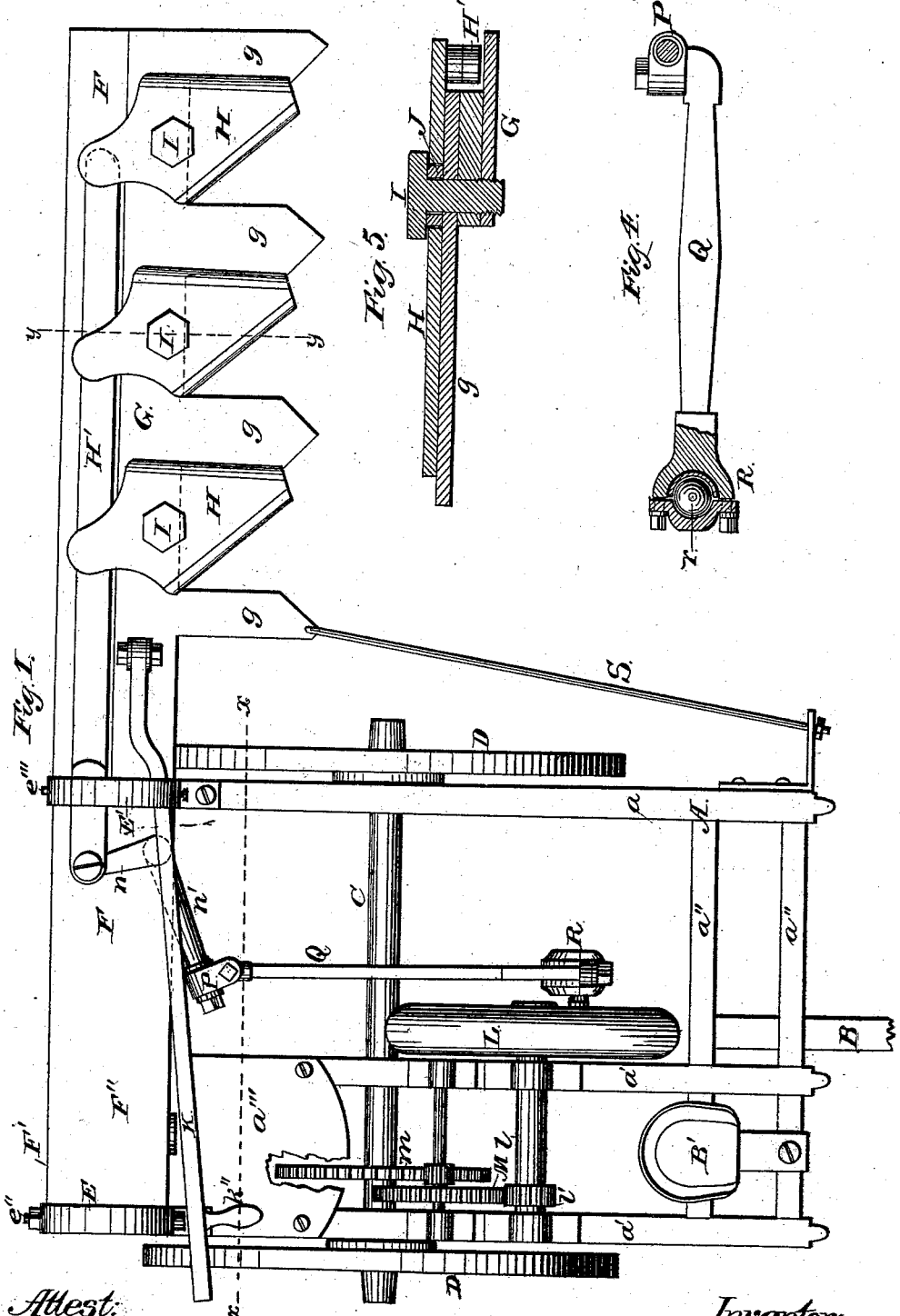

T. V. NICHOLS.
Hedge-Trimming Machines.
No. 214,689.  Patented April 22, 1879.
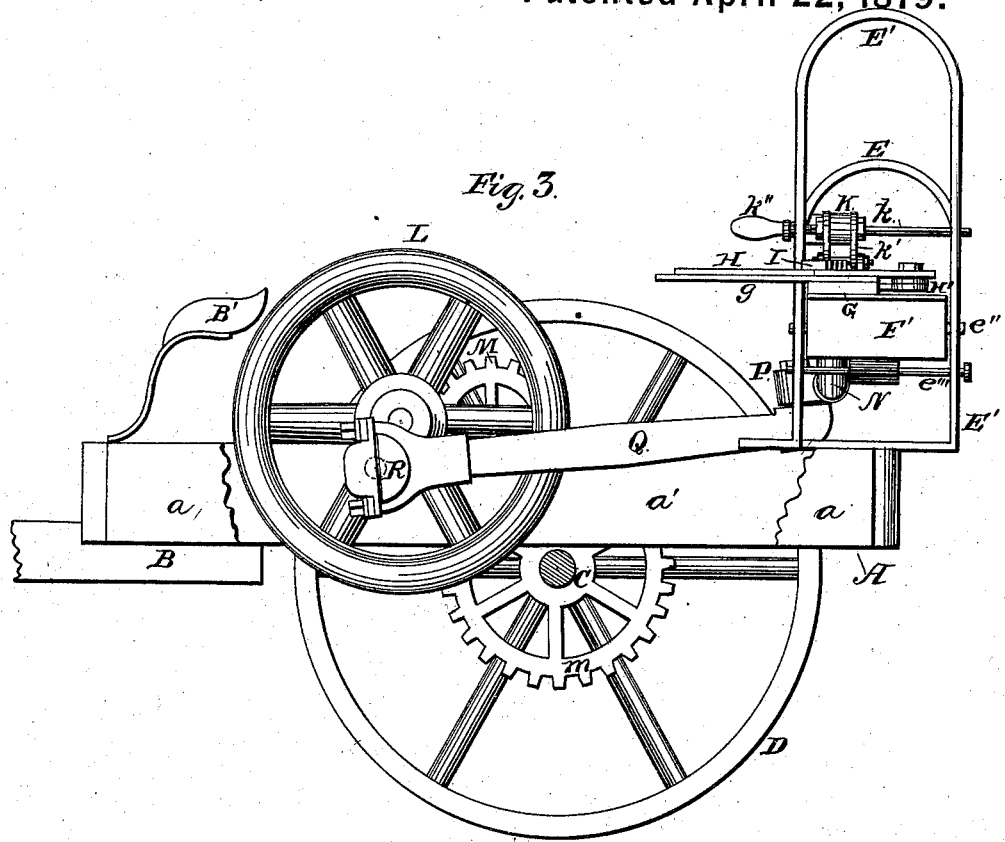
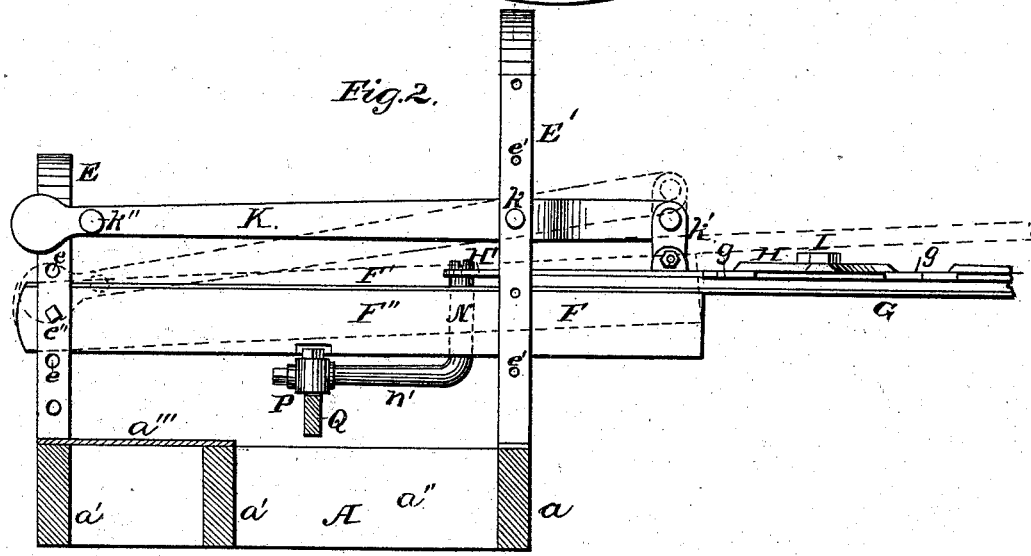
Attest:
F. B. Brock
D. G. Stuart
Inventor:
Thomas V. Nichols,
by W. B. Richards
Attorney.

UNITED STATES PATENT OFFICE.

THOMAS V. NICHOLS, OF OLENA, ILLINOIS.

IMPROVEMENT IN HEDGE-TRIMMING MACHINES.

Specification forming part of Letters Patent No. 214,689, dated April 22, 1879; application filed December 2, 1878.

*To all whom it may concern:*

Be it known that I, THOMAS V. NICHOLS, of Olena, in the county of Henderson and State of Illinois, have invented certain new and useful Improvements in Hedge-Trimming Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a top-plan view of a machine embodying my invention. Fig. 2 is an elevation in the sectional plane of the line $x\ x$ in Fig. 1. Fig. 3 is a side elevation, the near side frame partly broken away to show parts beyond. Fig. 4 is a vertical sectional view in the coupling to the crank-wheel. Fig. 5 is a sectional view in the line $y\ y$ in Fig. 1.

This invention relates to hedge-trimming-machines; and consists in certain improvements therein, as hereinafter more fully set forth, and pointed out in the claims.

Referring to the drawings by letters, the similar letter of reference referring to the like parts in all of the figures, letter A represents a frame, on which the working parts are seated, and is formed of longitudinal bars $a\ a'\ a'$, connected by transverse bars $a''$. The frame A has a draft-pole, B, at its forward end and a driver's seat, B', to one side thereof, and is supported by suitable journals on an axle, C, which is carried on wheels D, provided with the ordinary ratchets and pawls, so that either wheel going forward will rotate the axle, and going backward will turn loosely thereon.

E E' are arches projecting upward from the rear part of the frame A, and having series of holes $e\ e'$ respectively. F is the finger-bar head, formed preferably at one end, F', of a bar of wood, with a plate of metal, F''', bolted thereon and extending outward, and having the finger-bar G bolted to its upper front side. The finger-bar G is preferably formed of a series of plates of iron or steel with hardened surfaces, bolted to each other, to give rigidity with lightness, and has fingers $g$ projecting forward therefrom, same as shown and described in my patent of October 24, 1876, No. 183,506. The cutters H are also shaped and arranged over the fingers G, and journaled to the cutter-bar H', as shown and described in said patent. The cutters H are journaled to the finger-bar G as follows:

Bolts I pass through the cutters H, the finger-bar G, and the plate F'', and are surrounded where they pass through the cutters H by annular rings J, which are a very little thicker than the cutter, so that the head of the bolt I will rest upon the ring J, and close enough to the cutter to keep it in working position and prevent it getting loose and wabbling from wearing, as shown at Fig. 5 of the drawings.

The finger-bar head F is journaled at one end in the holes $e$ in the arch E by a bolt, $e''$, and rests mid-length upon a bolt, $e'''$, in the holes $e'$ in the arch E', so that its outer end may be raised and lowered, as shown by dotted lines at Fig. 2 of the drawings, by means of a lever, K, which is journaled at $k$ to the arch E', and connected at one end by a link, $k'$, with the finger-bar, while its other end extends across the machine, and is provided with a handle, $k''$, within reach of a second attendant, who stands upon a platform, $a'''$, on the frame A.

L is a crank-wheel fixed on a shaft, $l$, journaled in the frame A, and has a pinion, $l'$, gearing with another pinion, M, which is connected by gears with a pinion, $m$, on the rotating axle C.

N is a short vertical shaft journaled in the finger-bar head F, its upper end having a crank, $n$, journaled to the end of the cutter-bar H', and its lower end having a crank, $n'$, journaled horizontally in one end of a link, P, to the other end of which link P a connecting-rod Q, is journaled by a vertical journal, so as to form a coupling between the rod Q and crank $n'$, with two axes of flexure. The other end of the connecting-rod Q is connected with the wrist-pin R of the crank-wheel L by a universal-joint coupling, as shown at Fig. 4 of the drawings, which is a sectional view of said coupling, showing the ball $r$ on the end of the wrist-pin R and its bearings. S is a fender, for the purpose of pressing the side branches away from the wheel and toward the cutter.

In operation, the finger-bar head F is adjusted in the arches E E' to about the height it is desired to trim the hedge. The machine is then driven alongside of the hedge, and will cut the upper portion of the hedge off, leaving the lower part horizontal on top; and if the wheel at either side of the machine should drop into a low place, or raise to pass over a high place in the ground, the second attendant, by means of the lever K, may readily raise or lower the outer end of the cutter-bar head, and thus keep it in a horizontal position.

If the ground at the side of the hedge is uniformly inclined in either direction to or from the hedge, it will be evident that the cutter-bar head may be adjusted in the arches E E′ to adapt it to the inclination.

The connections at both ends of the connecting-rod Q are such as to permit it to work freely when the cutter-bar head is brought to its various adjustments.

The machine may be adapted for reaping and mowing by a lower construction of the parts.

What I claim as new is—

1. In a hedge-trimming machine, the frame A, having the perforated arches E E′, in combination with the adjustable finger-bar head F, hinged to the arch E, pins $e''$ $e'''$, and lever K, attached to said head and pivoted to the arch E′, substantially as described, and for the purpose set forth.

2. The combination, with the frame A, provided with the perforated arches E E′, pins $e''$ $e'''$, and hinged head F, provided with the pivoted lever K, and adjustable as described, of the cranked lever N, cutter-bar H, connecting-rod Q, crank-wheel L, pinion $l'$, and intermediate gearing connecting it with the pinion $m$ on the axle, substantially as described, and for the purpose set forth.

In testimony that I claim the foregoing as my own I affix my signature in presence of two witnesses.

THOMAS V. NICHOLS.

Witnesses:
H. A. ALLEN,
P. R. RICHARDS.